March 23, 1943.  W. BLAIR  2,314,760
POWER SCREW DRIVER
Filed May 8, 1941  3 Sheets-Sheet 3

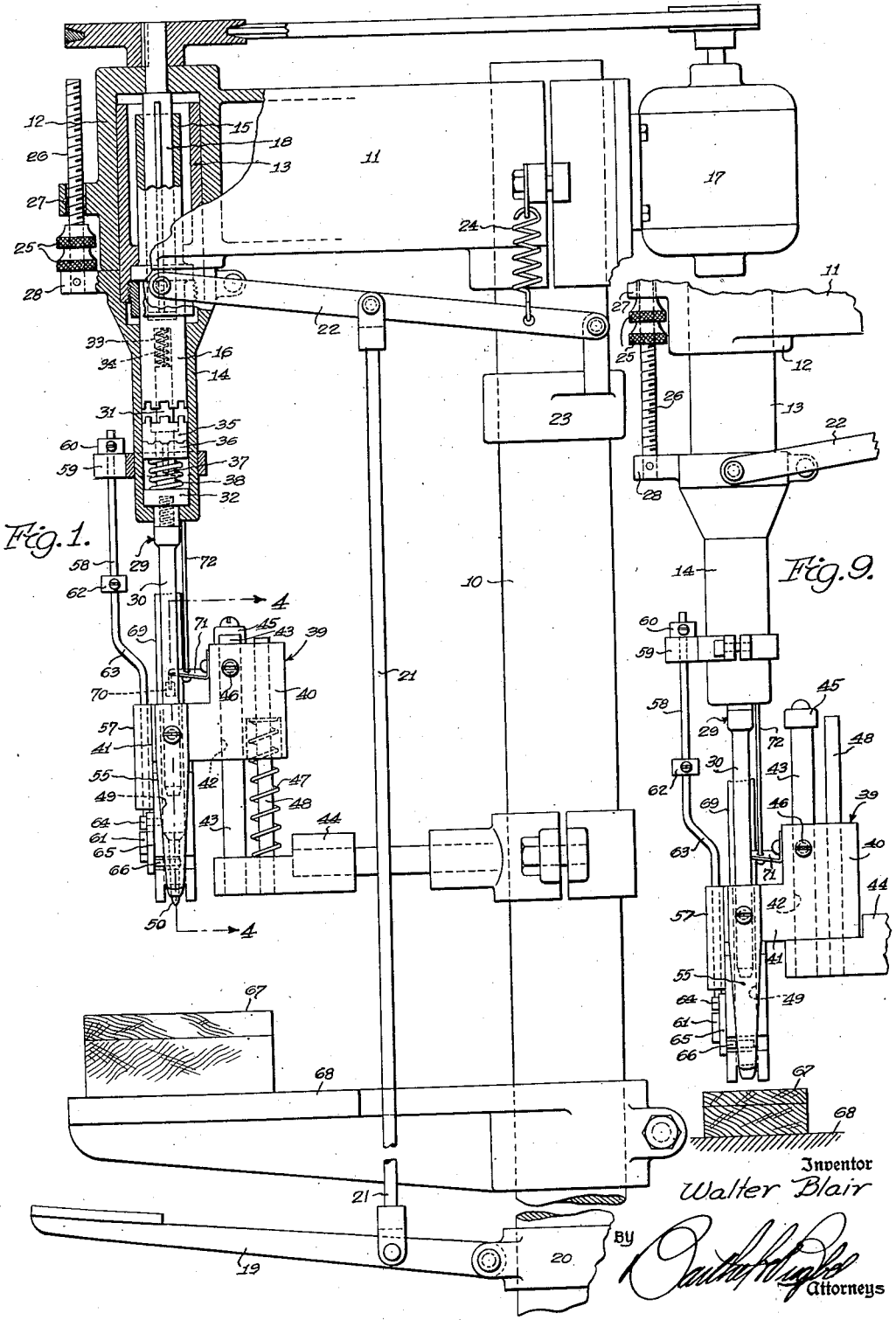

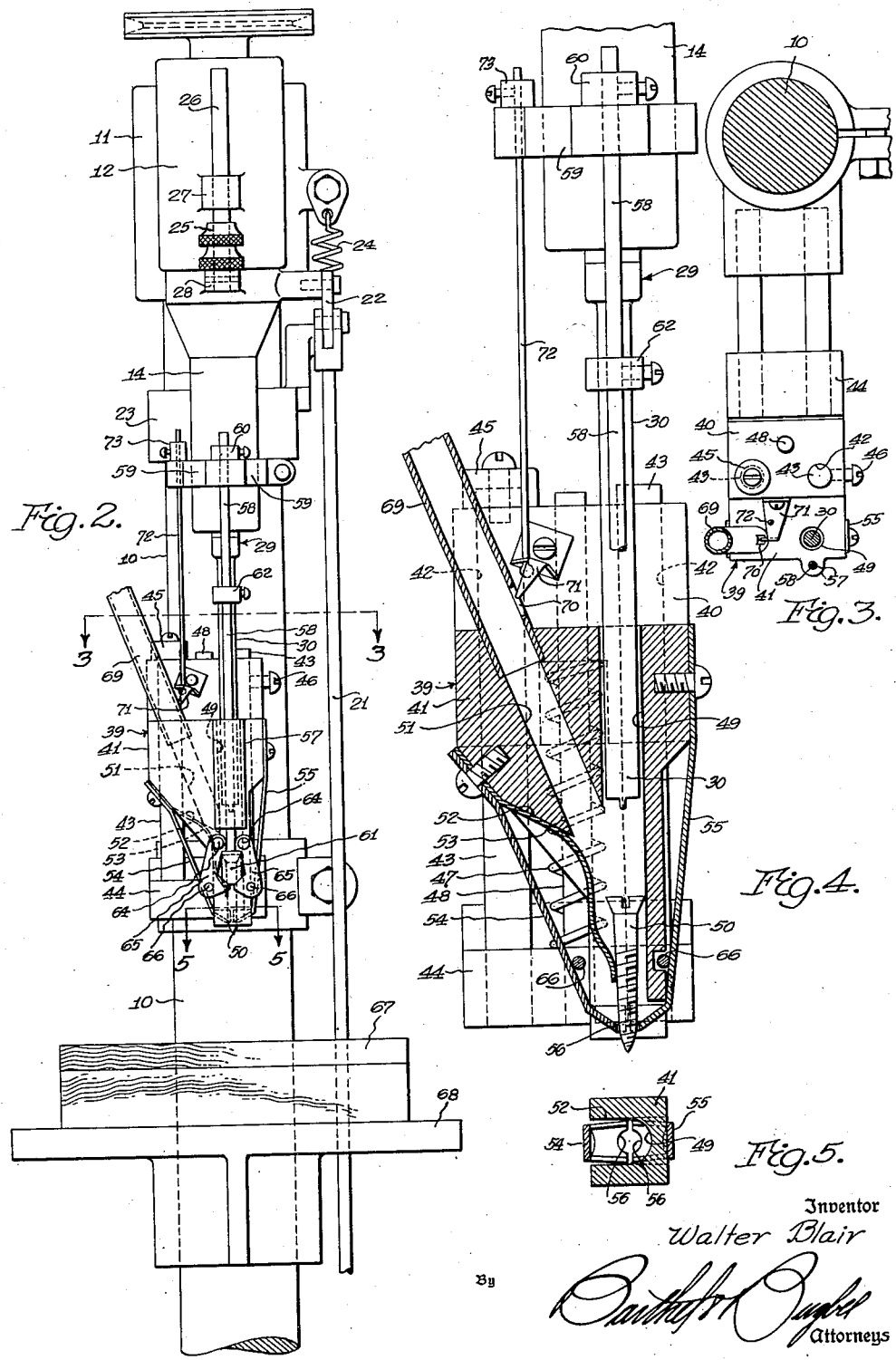

Inventor
Walter Blair
By Bartheff Pughf
Attorneys

Patented Mar. 23, 1943

2,314,760

UNITED STATES PATENT OFFICE 2,314,760

POWER SCREW DRIVER

Walter Blair, Detroit, Mich., assignor to Phillips Screw Company, a corporation of Delaware Application May 8, 1941, Serial No. 392,422

3 Claims. (Cl. 144—32)

This invention relates, in general, to tools and, in particular, to a screw driving device of the power driven type.

One of the objects of the present invention is to provide a new and improved screw driving device which may be operated similarly as a drill press or other like device and equally as easily and efficiently.

Another object is to provide a new and improved screw driving device of the power driven type the parts of which are few, compactly arranged and adapted for ready and easy adjustment to meet various conditions of operation.

Another object is to improve a power driven screw driver so that the treatment of the screw itself is without the faults and objections previously found inherent in devices of a similar character.

Another object is to provide a new and improved power driven screw driving device wherein the power necessary to eject the screw from said device during the final stages of the fastening operation is derived, not from the force exerted by the driving element itself, as has previously been the case, but from a force entirely independent thereof.

Another object is to improve a power driven screw driving device wherein the means which make possible the screw driving and charging operations are novelly arranged and correlated so that said operations may be carried out with greater speed, accuracy and automaticity than heretofore.

Other objects and advantages of the invention will become readily apparent from a reference to the following specification taken in conjunction with the accompanying drawings of which there are three (3) sheets and wherein:

Figure 1 is a side elevational view, shown partly in section, of the machine as a whole and with its driving structure in elevated, inoperative position;

Figure 2 is a front elevational view of the machine shown in Figure 1;

Figures 6, 7, 8, 10, 11:
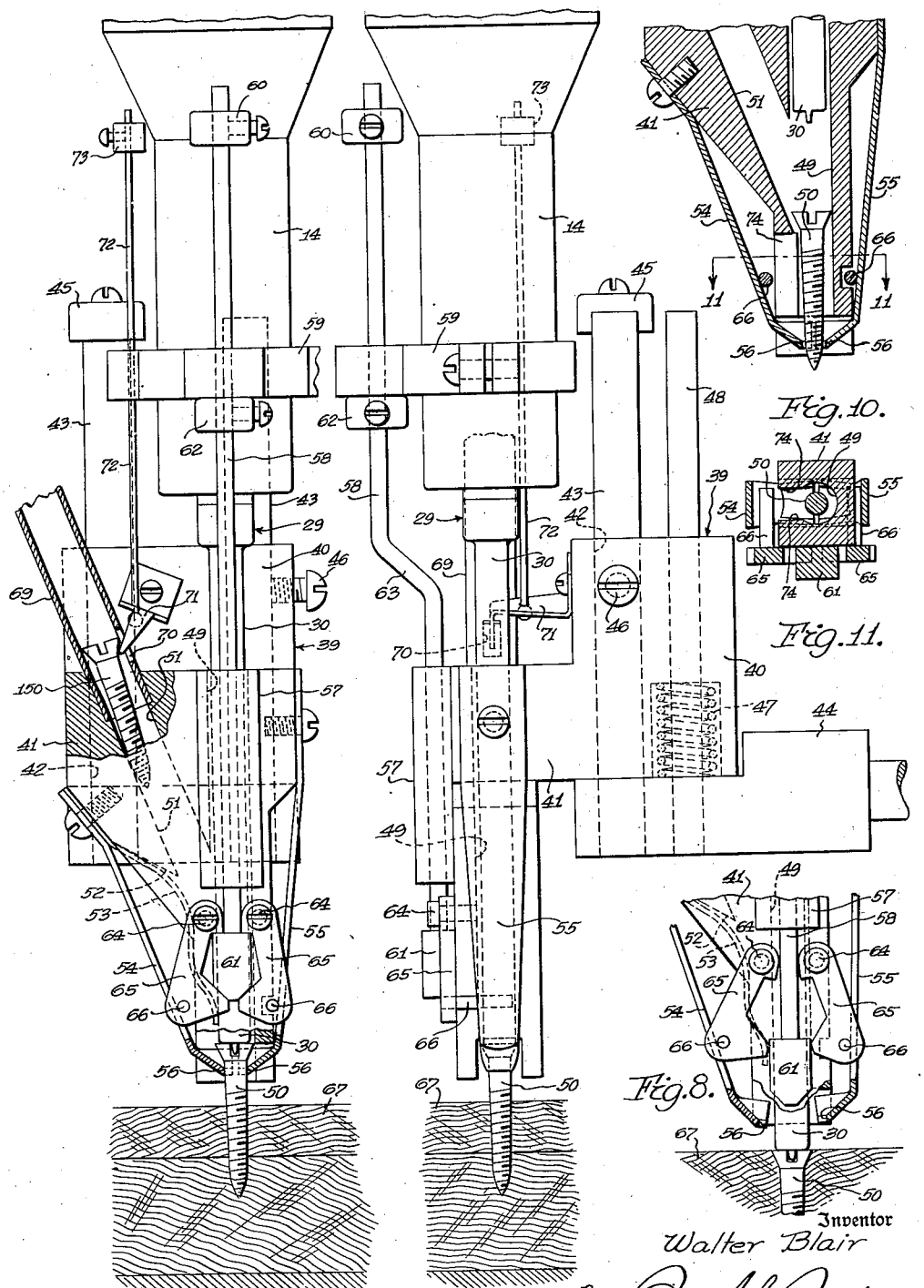

Figures 3 and 5 are sectional views taken, respectively, along the lines 3—3 and 5—5 in Figure 2;

Figure 4 is a sectional view taken along the lines 4—4 in Figure 1;

Figures 6 and 7 are, respectively, front and side elevational views of the machine and show the driving structure in the lowered, operative position assumed thereby immediately prior to the complete ejection of the screw from the tool-receiving barrel, said Figure 6 being partly broken away and in section to illustrate more clearly some of the details of the construction thereat;

Figure 8 is an elevational view of the lower end of the structure shown in Figure 6 but illustrates the positions assumed by the parts thereat to permit the "driving home" of the screw into the work;

Figure 9 is a view similar to Figure 1 but shows the parts of the machine positioned to meet a different working condition, namely, a condition where it is desired to maintain a decreased spacing between the work and the inactive position of the driving structure;

Figure 10 is a sectional view of the lower end of a modified head for the driving structure; and Figure 11 is a section taken along the lines 11—11 in Figure 10.

Referring to the drawings, the machine includes a supporting column 10 at the upper end of which is stationarily mounted a bracket or support 11 formed with a hollow boss portion 12. Boss 12 slidably receives the upper element 13 of a non-rotatable, rectilinearly movable, tubular unit which also consists of a lower element 14 residing below said boss. Unit 13—14 internally receives the upper and lower elements of a rotatable unit 15—16 which is rectilinearly movable therewith.

Purely for the purpose of illustration, rotation of unit 15—16 is shown to be brought about by the influence of a motor 17 anchored to bracket 11 and in driving connection with a shaft 18 splined to upper element 15 of said unit. On the other hand, rectilinear movement of units 13—14 and 15—16 may be brought about by the actuation of a foot lever 19 which is pivotally secured to a collar 20 carried on column 10 and drives a rod 21 pivotally secured at one end to said lever and at the other end to an arm 22 which is pivotally secured at one end to said unit 13—14 and at the other end to another collar 23 also carried on said column.

Units 13—14 and 15—16 are normally held in their uppermost positions with respect to boss 12 by means of a spring 24 operatively interconnecting bracket 11 and lever-rod-arm unit 19—21—22, this positioning being normally determined by an abutting relation between the lower end of said boss and the upper end of element 14 of said unit 13—14 but being adjustable, when desired, to a lower limit by manipulation of an adjustment device consisting of means such as a nut 25 and a stem 26 threadedly receiving said nut. Laterally extending portions 27 and 28 are formed on boss 12 and element 14 and one of these portions fixedly carries one end of stem 26 while the other provides a free passageway for said stem and an abutment for nut 25.

A tool or element, generally indicated at 29, is carried by lower element 14 of non-rotatable, rectilinearly movable unit 13—14 and has a lower, screw driving element 30 projecting downwardly from said element 14 and an upper shank portion 31 projecting upwardly into said element 14, there being a collar 32 formed on said implement and normally residing on the upper surface of the lower end of said element 14. The upper end of shank 31 extends into a bore 33 provided therefore in the lower end of lower element 16 of rotatably and rectilinearly movable unit 15—16, and a spring 34 is arranged between said upper end of said shank and the upper end of said bore so as to provide for a slight play in the rectilinear movements of said unit 15—16 and implement 29. Shank 31 carries a sectional clutch member consisting of upper and lower sections 35 and 36 operatively inter-engaged for rotating normally together but capable of entertaining slippage therebetween under certain abnormal circumstances, the portion of said shank receiving said lower section 36 being splined thereto, as at 37, whereas said upper section 35 is freely received on said shank. The lower end of element 16 of unit 15—16 and the upper end of section 35 of unit 35—36 are surfaced for driving-driven engagement therebetween upon contacting each other, and this contact is brought about upon upward movement of implement 29 which is opposed by spring 34 and acts through a spring 38 telescopically arranged about shank 31 between collar 32 and said unit 35—36.

A head member, generally indicated at 39, having a rear, upwardly extending body portion 40 and a front, downwardly extending body portion 41 integral therewith, is provided and is adapted for vertical, rectilinear movement similarly as implement 29 by the provision of guideway means 42 formed through said body portion 40 and the reception thereby of guide means 43 formed on and extending upwardly from a horizontally extending support 44 carried on column 10 well below bracket 11. The extent of the upward travel of head member 39 relatively to support 44 may be limited by means of a stop 45 carried by guide means 43 for being abutted by body portion 40 of said head member, and said head member may, when desired, be adjusted to and held in a lowered position with respect to said support by means of a set screw 46 carried by said body portion and cooperable with said guide means. Downward movement of head member 39 with respect to supporting member 44 is opposed by means of a spring 47 arranged between said members on a guide 48 fixed to one of said members and freely received by the other of said members.

Body portion 41 of head member 39 is formed therethrough with a passageway 49 in which is received the lower end of driver element 30, said passageway also being operable for receiving, ahead of said element, a fastener element, such as a screw 50, which is operable for being introduced into said passageway from a second passageway 51 formed in said body portion in inclined and intercommunicated relationship with said passageway 49. One side of the lower end of body portion 41 is slotted, as at 52, to expose that portion of passageway 49 residing ahead of passageway 51, and a plate spring 53 is carried within said slot and has its upper end secured to the wall thereof and its lower end extending into said passageway 49 into yieldable abutment with the shank of fastener 50. Two other plate springs 54 and 55 are also employed, the former being carried over spring 53 and having its upper end secured to body portion 41 and the latter having its upper end secured to the opposite side of said body portion, the free ends of said springs 54 and 55 extending over the lower end of passageway 49 and each being formed with a portion cooperable with the other to provide an aperture 56 in alignment with said passageway and variable in area depending upon the relative positioning of said free ends. When a fastener 50 has been introduced into passageway 49 ahead of driver 30, said fastener will drop into the position thereof shown in Figure 4, spring 53 tending to prevent further descent of said fastener and the diameter of aperture 56 being not much greater than that of the fastener shank so that said fastener may be held at this time in substantial alignment with the axis of said passageway. The lowering of driver 30 will first bring it into contact with fastener 50 and then force the latter downwardly in opposition to spring 53 until the head of said fastener meets the lower ends of springs 54 and 55, whereupon the shank of said fastener is made clearly visible to the operator to aid him in inter-aligning said shank and the work prior to the inter-joining thereof, but the area of aperture 56 is insufficient to permit passage of said head therepast in the absence of the exertion of an additional force, which is to be described.

The front side of body portion 41 of head member 39 is formed with a hollow boss 57 through which is provided a vertical bore axially parallel with and forwardly spaced from the longitudinal axis of driver 30, said bore slidably receiving a rod 58 which extends above the upper end of said boss and below the lower end thereof. The upper end of rod 58 extends freely through the front side of a collar 59 adjustably fixed to the lower end of element 14 and carries an adjustable stop 60 for movement with said rod into and out of abutment with the upper surface of said collar, and the lower end of said rod has fixed thereto an enlarged portion or cam member 61, said rod being also provided with another adjustable stop 62 for movement with said rod into and out of abutment with the lower surface of said collar and an offset 63 between boss 57 and said stop 62. The front side of body portion 41 has secured thereto, below the lower end of boss 57 and by means of pivot pins 64, the upper ends of a pair of laterally spaced and movable followers 65 between which is received cam 61, said followers being adapted for movement away from each other about said pins upon movement of said cam downwardly from its normal upper position and for movement toward each other about said pins upon resumption by said cam of said upper position. The lower ends of followers 65 are provided with rearwardly extending pins 66 which are in engagement with the under surfaces of springs 54 and 55 and serve as the driving means, upon the lowering of cam 61, for spreading said springs to increase the area of aperture 56 and permit free outward passage of the screw head therethrough and as the driven means, upon the raising of said cam, for returning said followers to their normal positions responsive to the forces exerted by said springs and reducing said area to its normal value.

The force necessary to spread followers 65 against the action of the springs 54 and 55 is greater than that necessary to compress spring 47. This results in an initial downward movement of the head and implement until the head engages the abutment 44.

It will be noted in Figure 1, wherein implement 29 and head member 39 are in their uppermost positions, that the vertical spacing between the under surface of collar 59 and the upper surface of stop 62 is equal substantially to that between the under surface of body portion 40 and the upper surface of support 44. The closing of these spacings will position the parts as they are shown in Figures 6 and 7, and further depression of lever 19 will cause the vertical spacing (shown in Figure 1) between offset 63 and the upper surface of boss 57 to be reduced to zero and the parts to take the positions shown in Figure 8. In other words, springs 54 and 55 oppose spreading thereof until collar 59 and stop 62 become interengaged, whereupon the force exerted by further lowering of unit 13—14 is applied through rod 58 to cam 61 and effectuates said spreading. The vertical spacing in Figure 1 between the top surface of the work, such as a piece 67 which is supported on a column supported table 68, and the lower end of body portion 41 of head member 39 is somewhat greater than the vertical spacing between the under surface of body portion 40 of said head member and the upper surface of support 44 so that there will be a slight spacing between said work piece surface and said lower end of said body portion 41 upon the positioning of the parts as they are shown in Figure 8. Releasing lever 19 will, of course, return the parts from their positions of Figure 8 to those of Figure 1, stop 60 and collar 59 coming into play just short of the end of the return stroke.

Body portion 41 of head member 39 preferably carries a conduit 69 in communication at its lower end with inclined passageway 51 and at its upper end with any desirable means (not shown) whereby said conduit may be singly charged with stored screws or fastener elements 150 (see Figure 6). Conduit 69 is formed with an aperture 70 in the side wall thereof, and in adjacency to said aperture the front wall of body portion 40 is provided with a flexible detent 71 which normally extends through said aperture to prevent passage of a screw 150 along said conduit therepast. Detent 71 has connected thereto the lower end of a pull rod 72 which is freely received by collar 59 and adjustably carries on its upper end a stop 73, this stop being engaged by said collar as unit 13—14 approaches the upper limit of its movement so as to draw said detent out of conduit 69 to permit the screw 150 being held thereby to move therepast.

It may be desired to operate the machine with a vertical space between the lower end of body portion 41 and the upper surface of work piece 67 less than that shown in Figure 1, and, in this event, reference is made to Figure 9. It will be noted in this figure that body portion 40 and support 44 are set in inter-engaging condition by means of set screw 46 and that nut 25 is positioned well above abutment 28 on element 14, the setting of said nut determining the upper extent of the travel of unit 13—14. In this position of the machine parts, the travel of driver 30 and the function of stops 62 and 60 are the same as shown in Figure 1 except that the motion of head member 39 with respect to support 44 and work piece 67 has been eliminated, operation of lever 19 having the same function as before to lower driver 30 into engagement with fastener 50 and spreading springs 54 and 55 to permit complete ejection of said fastener through aperture 56.

In Figures 10 and 11, there is shown a slightly modified form of head end for the head member 39. For example, spring 53 and slot 52 have been eliminated and that portion of passageway 49 residing below the lower end of passageway 51 is provided with a slotted portion 74, the walls of which extend slightly into said passageway 49 to provide a guide for the head end of fastener 50 and minimize the amount of play between the wall of said passageway 49 and the walls of said slot 74.

Although the invention has been described with some detail, such description is for the purpose of illustration only and is not to be taken as definitive of the limits of the inventive idea. The right is reserved to make such changes in the details of construction and arrangement of parts as will fall within the purview of the attached claims.

What I claim is:

1. In a device of the character described, a head member formed therethrough with a passageway, said passageway being operable for receiving an implement rectilinearly movable along a definite path and a fastener element ahead of and engageable by the implement for being driven thereby into fastened relationship with a work piece, means for moving said implement, means forming an aperture of variable area ahead of and in alignment with the fastener element, the area of said aperture normally being relatively small to oppose forward passage of the fastener element as a whole therethrough but being enlargeable to permit such forward passage, means comprising a rectilinearly movable shaft carrying an adjustably mounted abutment for engagement by said means for moving said implement for exerting a force independent of the force exerted by the implement to operate said first-named means and effectuate said aperture enlargement, means operable for controlling the time of initiation of the operation of said second-named means with respect to the time for the arrival of the implement at the end of its forward movement.

2. In a device of the character described, a pair of coaxially arranged body members relatively movable toward and from each other, one of said members being operable for supporting an end of a rotatable implement for movement substantially rectilinearly therewith and the other of said members being formed therethrough with a passageway operable for receiving the other end of the implement and a fastener element ahead of the implement cooperable therewith for being driven thereby into fastened relationship with a work piece, a pair of spring members carried on opposite sides of said other body member and having portions operable for forming an aperture of variable area ahead of the fastener element to serve as the outlet for said passageway, said portions being normally constrained into positions whereat said area is insufficient to permit free passage of the fastener element through said outlet but being operable for assuming positions whereat said area is sufficient to permit such passage, a wedge shaped driving member laterally spaced from the implement and having an interval of movement effectuated by and existent during an end portion of the movement of said body members toward each other, a pair of pivoted driven members interposed between and in driving engagement with said spring members and in driven engagement with said driving member for urging said portions of said spring members into said second-named positions therefor responsive to said movement of said driving member, and means operatively interconnecting said one body member and said driving member for varying said interval of movement of said driving member with respect to said end portion of movement of said body members.

3. In a device of the character described, a head formed therethrough with a vertical passageway and an inclined passageway in open communication therewith, an implement having a longitudinal axis and received within said vertical passageway for movement at least along said axis, said vertical passageway being operable for receiving a fastener element from said inclined passageway ahead of said implement, means for intermittently releasing the fastener element from the inclined passageway into said vertical passageway ahead of said implement, means providing an aperture ahead of the fastener element of variable area in axial alignment with said axis and normally operable for maintaining said aperture at a relatively smaller area than its greatest area so as to oppose movement of the fastener element as a whole therethrough, means movable along a path spaced from said axis, and means operatively connected to said third-named means and responsive to movement of the latter for actuating said second-named means to provide an aperture having a relatively greater area than its smallest area so as to permit movement of the fastener element as a whole therethrough.

WALTER BLAIR.